(No Model.)
G. JONES.
PROCESS OF AND APPARATUS FOR MAKING AND BURNING FUEL GAS.
No. 507,500. Patented Oct. 24, 1893.
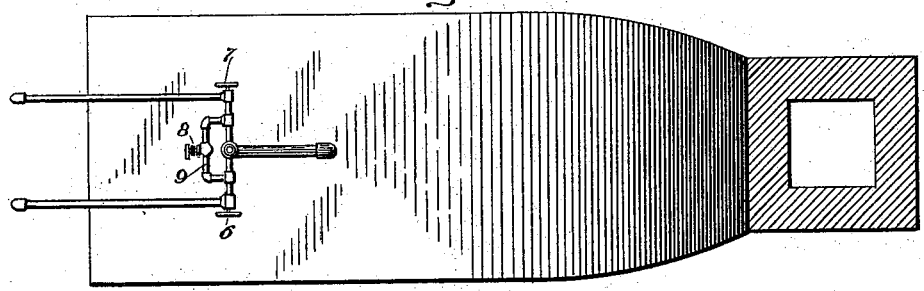
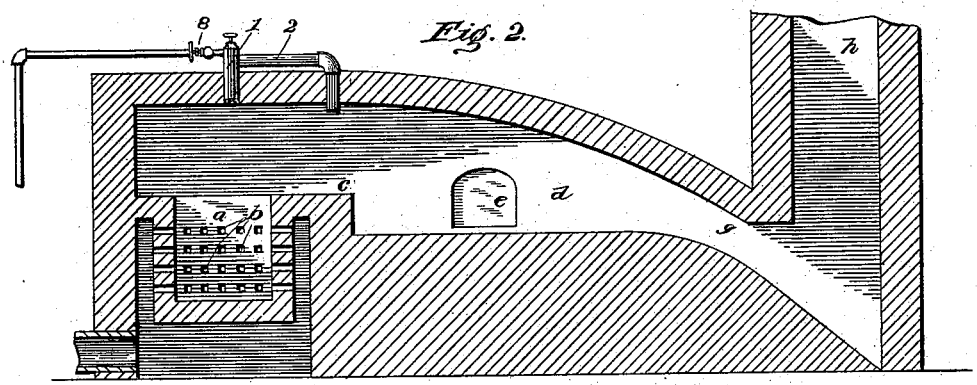
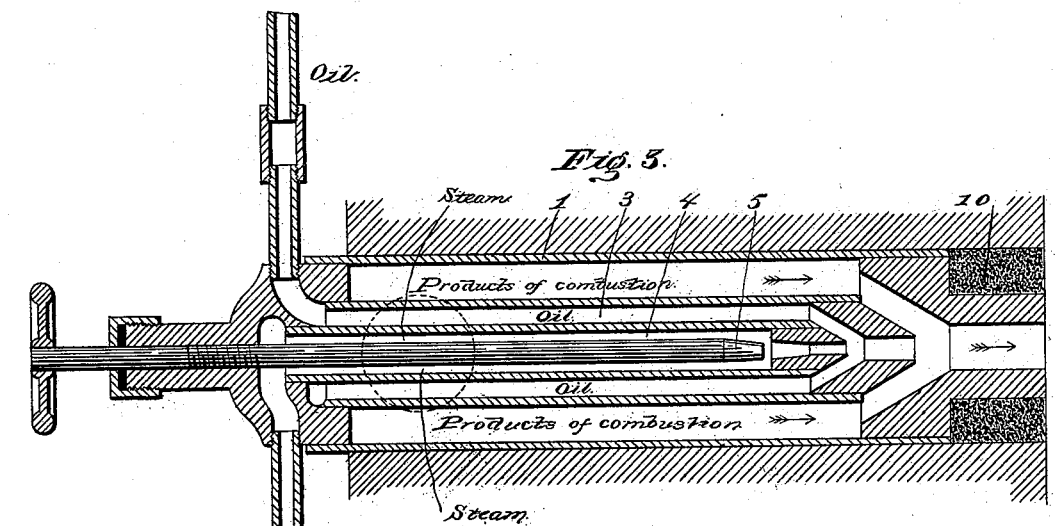

UNITED STATES PATENT OFFICE.

GOMER JONES, OF NEWARK, NEW JERSEY, ASSIGNOR OF ONE-HALF TO THE BROWN DEVELOPING COMPANY, OF NEW JERSEY.

PROCESS OF AND APPARATUS FOR MAKING AND BURNING FUEL-GAS.

SPECIFICATION forming part of Letters Patent No. 507,500, dated October 24, 1893.

Application filed June 23, 1893. Serial No. 478,678. (No model.)

*To all whom it may concern:*

Be it known that I, GOMER JONES, a citizen of the United States, residing in the city of Newark, Essex county, New Jersey, have invented certain new and useful Improvements in the Process of and Apparatus for Making and Burning Fuel-Gas and I do hereby declare that the following is a full, clear, and exact description of the same.

My invention relates to an improved process of making and burning fuel gas, and to apparatus for carrying the process into effect.

The invention involves a continuous process of making and burning fuel gas, and consists essentially in taking incandescent products of combustion from a furnace chamber into juxtaposition with hydro-carbon and water vapors without mixing, imparting heat to said vapors from said products, afterward mixing and discharging said vapors and products to said chamber, thereby decomposing the carbon-dioxide and water vapors, releasing the hydrogen, and uniting the carbon and oxygen constituents in a new combination, as carbon-monoxide, and finally supplying air to support combustion.

The apparatus consists essentially in the combination of a furnace, an oil and steam conduit leading to said furnace, means for transferring incandescent products of combustion from a part of the furnace which contains such products to a part adjacent to the steam and oil inlets and ports for supplying air to support combustion.

In the drawings forming a part of this specification, Figure 1 is a plan, and Fig. 2 is a vertical section, of a conventional heating furnace with connections showing my apparatus for practicing my new process. Fig. 3 is a longitudinal section of an injector device for withdrawing incandescent products of combustion from the furnace, for returning said products and for introducing steam and oil vapors to said furnace.

A is an ordinary heating furnace, having a fire-chamber $a$, air-ports $b$, bridge-wall $c$, iron chamber $d$, charging-door $e$, throat $f$, neck $g$ and stack $h$. Connected with this furnace is an injector device consisting of a shell or casing 1, having a branch conduit 2 leading to it from a point over the bridge-wall, as shown, or from any part of the furnace which contains incandescent products of combustion. Concentric with the casing is an oil conduit 3, and concentric with the oil conduit is a steam conduit 4, both conduits leading from suitable source of supply. The casing which, with branch 2, constitutes a conduit for products of combustion, and the oil and steam conduits 3 and 4 are provided with concentric nozzles, as shown, and the steam conduit is provided with a conical valve 5 to regulate the amount of steam admitted to the furnace. The respective oil and steam pipes are provided with suitable valves or cocks, by means of which the flow of oil and steam may be regulated or shut off and the pipe for the hot products of combustion may also be provided with a valve for a similar purpose, if desired. 6 is the cock or valve for the steam pipe, 7 the valve of the oil pipe, and 8 the valve in a cross-pipe 9 for connecting the steam and oil pipes. By this arrangement, I am enabled to shut off the flow of oil and steam, or to switch the steam from its passage to that of the oil passage and thereby blow out and clean the oil conduit, as occasion may require.

The injector device extends through the top wall of the furnace, and the front end or nozzle part is packed with fire cement, as shown at 10. The branch pipe 2 leads from a point over the bridge wall to the outer end of the casing. This pipe, as well as the shell 1, being exposed to a very high degree of heat, may be lined with a core or tube of refractory material. Obviously, the injector device may be attached to, or connected with, any part of the furnace desired, and will operate to carry out my process provided the branch pipe or products of combustion conduit leads from a part of the furnace containing incandescent products of combustion.

Operation: Steam is first admitted through conduit 4, and escaping forcibly from its contracted nozzle, draws the oil through conduit 3 and the atmosphere from the furnace over the bridge wall through branch 2 and shell 1. When the injected vapors are ignited, the atmosphere drawn from the furnace through branch 2 and shell 1, consists of the products of combustion. These products, in their highly-heated condition, passing through shell 1, impart heat to the oil, and as said oil becomes heated, it imparts heat to the steam, and as the products of combustion, steam and oil are mingled at an incandescent heat, the temperature of the mixture is equalized, and decomposition of the carbon-dioxide and the water vapors takes place and new combinations are formed in the furnace which are immediately ignited and consumed. Thus, a continuous process of producing and consuming gas is maintained by keeping up a supply of steam and oil.

I am aware that the products of combustion of carbonaceous fuel have been taken from a furnace chamber and injected into a gas retort, in connection with oil and steam, where carbonic acid is reduced and hydrogen released, and new combinations are formed in said retort which are conducted away for future use, but in such case the water and hydro-carbon vapors are not both heated by the hot products before being mixed, nor is the mixture introduced to the furnace chamber from which the products of combustion are drawn, as in my invention. I do not therefore claim broadly taking products of combustion from a furnace chamber and afterward mixing the same with steam and oil vapor to obtain the reactions herein named, but What I do claim, and desire to secure by Letters Patent, is—

1. The continuous process of burning fuel gas which consists in taking incandescent products of combustion from a furnace chamber into juxtaposition with hydro-carbon and water vapors without mixing any two of them, imparting heat to said vapors from the products, afterward mixing and discharging said products and vapors to said chamber, thereby decomposing the carbon-dioxide and water vapor, releasing the hydrogen and uniting the carbon and oxygen constituents in a new combination, as carbon monoxide, and finally burning the same, substantially as described.

2. In apparatus for making and burning fuel gas, the combination of a furnace, an oil and a steam conduit leading to said furnace, means for transferring incandescent products of combustion from a part of the furnace which contains such products to a part adjacent to the oil and steam inlets, and means for supplying air to support combustion.

3. In an apparatus for making and burning fuel gas, the combination of a combustion chamber, a central conduit leading from a steam generator, an oil conduit surrounding the steam conduit leading from an oil supply, and an outer conduit having a discharge nozzle common to all the conduits leading from a part of the combustion chamber containing products of approximately complete combustion back to said combustion chamber, substantially as described.

In testimony whereof I affix my signature in the presence of two witnesses.

GOMER JONES.

Witnesses:
WM. M. STOCKBRIDGE,
THEO. L. GATCHEL.